US007545997B2

(12) United States Patent
Lieberman et al.

(10) Patent No.: US 7,545,997 B2
(45) Date of Patent: Jun. 9, 2009

(54) SIMULATED HIGH RESOLUTION USING BINARY SUB-SAMPLING

(75) Inventors: David J. Lieberman, Fairport, NY (US); Adam E. Stein, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 874 days.

(21) Appl. No.: 10/939,099

(22) Filed: Sep. 10, 2004

(65) Prior Publication Data
US 2006/0056736 A1    Mar. 16, 2006

(51) Int. Cl.
G02K 9/32    (2006.01)
(52) U.S. Cl. .......................... 382/298; 382/240; 382/101
(58) Field of Classification Search ................ 382/298, 382/240, 101, 196, 9; 358/459
See application file for complete search history.

(56) References Cited

U.S. PATENT DOCUMENTS

| 5,083,210 | A | | 1/1992 | Reilly et al. |
| 5,113,486 | A | | 5/1992 | Luttmer |
| 5,131,049 | A | * | 7/1992 | Bloomberg et al. ......... 382/257 |
| 5,225,915 | A | | 7/1993 | Ciccone et al. |
| 5,416,851 | A | * | 5/1995 | Huttenlocher et al. ....... 382/196 |
| 5,528,704 | A | | 6/1996 | Parker et al. |
| 5,774,236 | A | * | 6/1998 | Blazey ....................... 358/3.14 |
| 5,822,542 | A | * | 10/1998 | Smith et al. ................. 709/247 |
| 5,854,858 | A | * | 12/1998 | Girod et al. ................. 382/250 |
| 5,917,952 | A | * | 6/1999 | Noh .......................... 358/3.07 |
| 6,346,993 | B1 | | 2/2002 | Curry |
| 6,430,304 | B2 | * | 8/2002 | Hanna et al. ................ 382/107 |
| 6,476,807 | B1 | * | 11/2002 | Duluk et al. ................ 345/421 |
| 6,510,177 | B1 | * | 1/2003 | De Bonet et al. ......... 375/240.16 |
| 6,738,496 | B1 | * | 5/2004 | Van Hall ..................... 382/101 |
| 6,904,176 | B1 | * | 6/2005 | Chui et al. ................... 382/240 |
| 7,266,250 | B2 | * | 9/2007 | Bloomberg et al. ......... 382/269 |
| 2001/0019621 | A1 | * | 9/2001 | Hanna et al. ................ 382/107 |
| 2001/0036307 | A1 | * | 11/2001 | Hanna et al. ................ 382/154 |
| 2002/0041705 | A1 | * | 4/2002 | Lin et al. .................... 382/165 |
| 2002/0102018 | A1 | * | 8/2002 | Lin et al. .................... 382/165 |
| 2003/0123696 | A1 | * | 7/2003 | Matsumoto et al. ......... 382/100 |
| 2004/0085588 | A1 | | 5/2004 | Loce et al. |
| 2004/0150684 | A1 | * | 8/2004 | Sanger et al. ................. 347/15 |

FOREIGN PATENT DOCUMENTS

JP    2001299761 A    * 10/2001

* cited by examiner

Primary Examiner—Samir A. Ahmed
Assistant Examiner—Tsung-Yin Tsai
(74) Attorney, Agent, or Firm—Fay Sharpe LLP

(57) ABSTRACT

In an image processing method, a first raster having a first resolution is divided into a plurality of sub-sampling cells each containing a selected number of neighboring pixels. A pixel from each of the sub-sampling cells is selected in a periodic or quasi-periodic pattern biased toward selecting a pixel position within each sub-sampling cell that is distal from a selection position within at least one neighboring sub sampling cell. The selected pixels define a second raster having a second resolution lower than the first resolution.

15 Claims, 11 Drawing Sheets

FIG. 2

| S1 | S8 | S15 | S22 | S29 |
| S2 | S9 | S16 | S23 | S30 |
| S3 | S10 | S17 | S24 | S31 |
| S4 | S11 | S18 | S25 | S32 |
| S5 | S12 | S19 | S26 | S33 |
| S6 | S13 | S20 | S27 | S34 |
| S7 | S14 | S21 | S28 | S35 |

SIMULATED HIGH RESOLUTION USING BINARY SUB-SAMPLING

BACKGROUND

The present exemplary embodiments relate to the data processing arts. They find particular application in conjunction with printing or other image marking applications in which the print or marking resolution is less than the image rasterizing resolution. However, it is to be appreciated that the present exemplary embodiments are also amenable to other applications, such as image size reduction, data compression for data transmission or storage, anti-aliasing via jaggie reduction, and so forth.

Typically, print quality as perceived visually increases with increasing resolution in binary raster image processing. Digitizing artifacts such as "jaggie" edges, moiré patterns, and abrupt grayscale shifts are reduced at higher resolution. However, bandwidth increases with the square of the resolution, so that higher resolution images are more expensive to accommodate because of the higher bandwidth and memory requirements. Moreover, the cost of printers and other marking engines generally increases with increasing marking resolution capability.

Often, the rasterization of a document is performed at the same resolution as is supported by the marking engine. A higher resolution rasterization would generate higher quality binary. However, applying a conventional sub-sampling technique to lower the resolution would eliminate this quality advantage. It is therefore desirable to develop novel sub-sampling techniques that mitigate image degradation due to the sub-sampling.

In a technique known as half-bitting, the rasterization alternates between black and white states near the edge of a letter of text or a line of line art. Such half-bitting reduces jaggie edges and moiré patterns by more faithfully representing the boundary between the black and white regions. While half-bitting can be useful for text and line art, it does not improve, and indeed may even degrade, halftone images. Moreover, half-bitting that is designed to improve vertical and/or horizontal lines can cause problems when applied to slanted lines.

In a technique known as stoclustic halftoning, the halftone dither array is randomly or pseudorandomly varied to produce texture variation in the halftone image. Stoclustic halftoning can soften transitions between image regions exhibiting different gray levels. However, stoclustic halftoning methods employ large stored arrays of dithering patterns and typically reduce rasterization productivity. Moreover, stoclustic halftoning techniques are generally not applicable to text and line art. There are some other effective anti-alias rendering techniques that are effective on text and line art only. However, these techniques are typically computationally intensive. Moreover, a thorough anti-aliasing approach requires use of both techniques, as well as a costly segmentation scheme to distinguish between pictorials and text or line art.

Accordingly, there remains a need for improved sub-sampling apparatuses and methods which are generally applicable for improving text, line art, and halftone images, and have low computational complexity, and which are readily adapted to existing rasterization and printing systems, and which have other advantages over existing apparatuses and methods.

BRIEF DESCRIPTION

In accordance with one aspect, a method is provided. A first raster having a first resolution is divided into a plurality of sub-sampling cells each containing a selected number of neighboring pixels. One pixel is selected from each of the sub-sampling cells in a periodic or quasi-periodic pattern biased toward selecting a pixel position within each sub-sampling cell that is distal from a selection position within at least one neighboring sub-sampling cell. The selected pixels define a second raster having a second resolution lower than the first resolution.

In accordance with another aspect, an image processor is disclosed. A raster image processor produces a first raster having a first resolution. A sub-sampler produces a second raster having a second resolution lower than the first resolution. The sub-sampler performs a method including: dividing the first raster into a plurality of sub-sampling cells each containing a selected number of neighboring pixels; and selecting a pixel from each of the sub-sampling cells. The selecting is performed in a periodic or quasi-periodic sequence that generally selects a pixel position within each sub-sampling cell that is distal from a selection position within at least one neighboring sub-sampling cell. The selected pixels define a second raster having a second resolution lower than the first resolution.

In accordance with yet another aspect, an electrophotographic marking method is provided. A first raster having a first resolution is divided into a plurality of sub-sampling cells each containing a 2×2 arrangement of four neighboring pixels. One of the four pixels from each of the sub-sampling cells is selected using a periodic or quasi-periodic sequencing that generally selects alternating corner positions to define a second raster having a second resolution lower than the first resolution. Values are determined for at least those pixels of the first raster which are identified by the sub-sampling as the selected pixels defining the second raster. An image having the second resolution is electrophotographically formed using the values of the selected pixels defining the second raster.

BRIEF DESCRIPTION OF THE DRAWINGS

FIGS. 2 and 3 illustrate aspects of the sub-sampling process performed by the image processing system of FIG. 1.

FIGS. 5A, 5B, and 5C illustrate example selection algorithms for use in the sub-sampling performed by the image processing system of FIG. 1.

DETAILED DESCRIPTION

Figure 1:
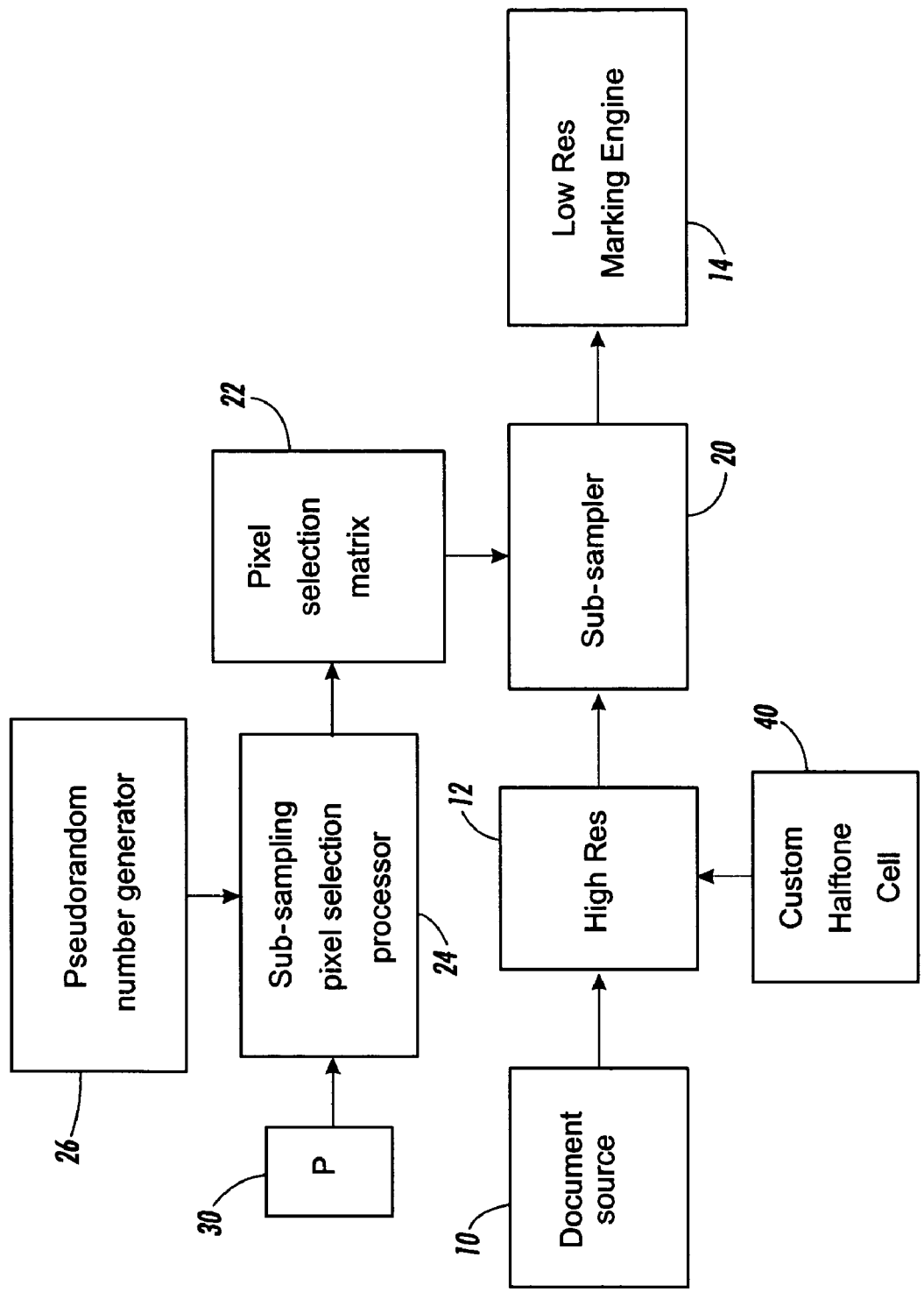
FIG. 1 diagrammatically shows an image processing system which rasters an image at a first high resolution and sub-samples the high resolution raster to produce a second lower resolution raster compatible with a lower resolution marking engine.

With reference to FIG. 1, an image processing system processes a document source 10, which may contain a continuous tone image, vector-based computer aided design (CAD) graphics, text, line art, or imbedded binaries, either alone or in mixed content. A high resolution raster image processor 12 rasterizes the document 10 using a raster of a first resolution to produce a rasterized image of pixel values having the first resolution. For example, the high resolution raster image processor 12 may rasterize the image to produce a rasterized image at 1200 dpi. This rasterized image is destined to be printed or otherwise rendered by a low resolution marking engine 14 that operates at raster of a second resolution which is lower than the first resolution. Continuing with the example in which the high resolution rasterization is at 1200 dpi, the second resolution of the marking engine 14 may be 600 dpi, for example. While sub-sampling from 1200 dpi to 600 dpi is used as an illustrative example herein, those skilled in the art can readily adapt the sub-sampling techniques describe herein to other sub-sampling situations, including sub-sampling situations in which the high resolution/low resolution ratio is other than 2:1.

Figure 2:
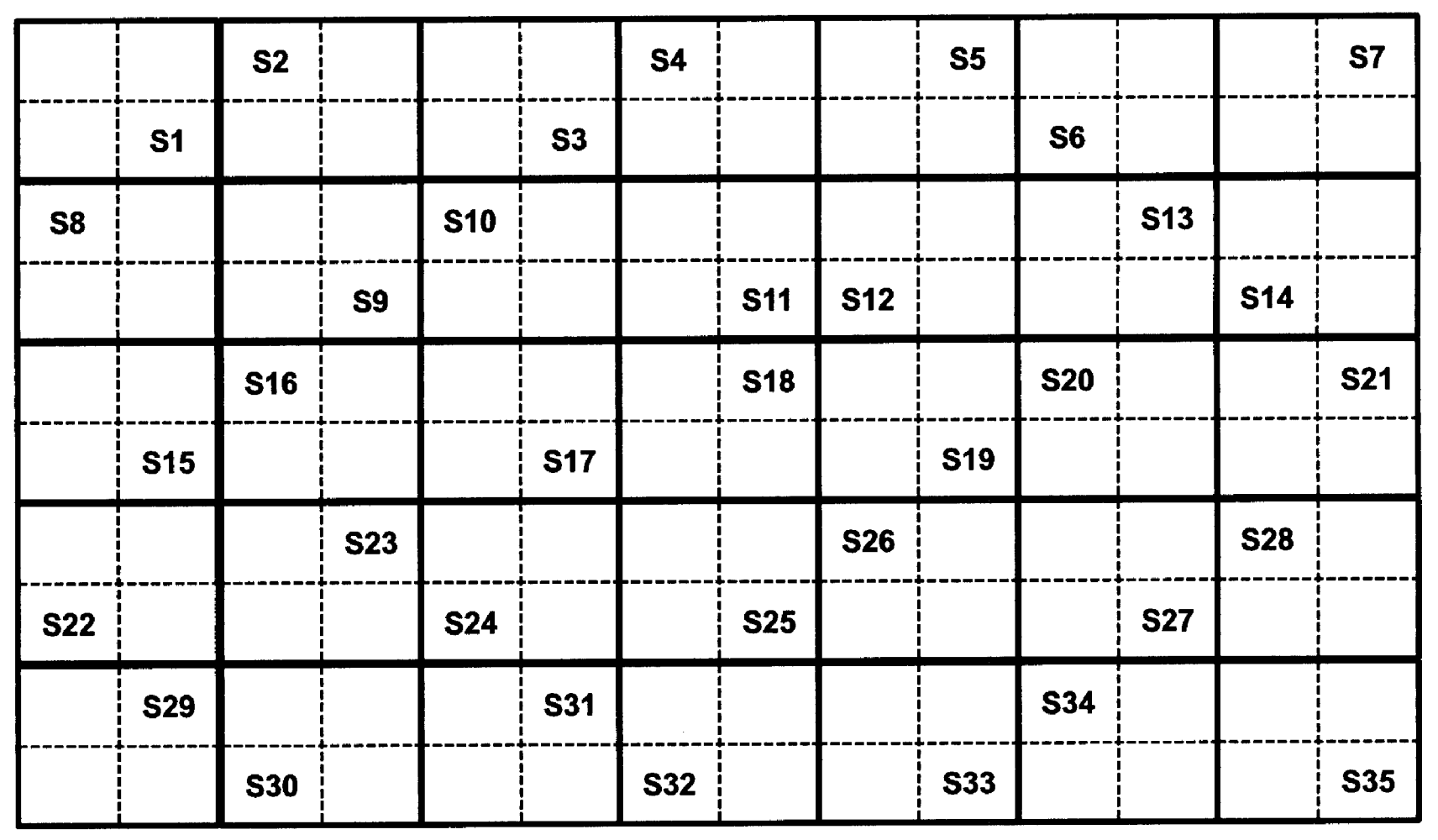

With continuing reference to FIG. 1 and with further reference to FIGS. 2 and 3, in order to adapt the high first resolution raster to the lower resolution marking device 14, a sub-sampler 20 selects a sub-sampling of the pixels of the first resolution raster to produce a lower second resolution raster matching the resolution of the marking device 14. FIGS. 2 and 3 illustrate a suitable sub-sampling example in which the first resolution is twice as high as the second resolution (such as the first resolution being 1200 dpi while the second resolution is 600 dpi). FIG. 2 shows the first resolution raster containing ten rows of fourteen pixels each. The first resolution raster is divided into a plurality of sub-sampling cells each containing a selected number of neighboring pixels. In FIG. 2, each sub-sampling cell is a 2×2 arrangement of neighboring pixels. The 2×2 sub-sampling cells are indicated heavy pixel border lines, while the four pixels within each sub-sampling cell are distinguished by lighter dashed border lines. The 10×14 first resolution raster is thus divided into a 5×7 arrangement of sub-sampling cells, which corresponds to the lower resolution of the second raster. Within each sub-sampling cell, one of the four high resolution pixels of the first raster is selected in a biased systematic fashion that is generally periodic, but whose periodicity is occasionally disrupted in a random or pseudo-random manner. In FIG. 2, the selected pixels are labeled "S1", "S2", "S3", . . . "S35". As illustrated in FIG. 3, these selected pixels define the second raster having the second resolution that is one-half that of the first resolution.

For sub-sampling ratios other than 2:1, appropriate sub-sampling cells are selected. For example, to sub-sample 2400 dpi to 600 dpi, a 4×4 sub-sampling cell can be employed. Still further, the sub-sampling can be non-isotropic. For example, a 4×2 sub-sampling cell is suitable for sub-sampling that reduces the resolution by a factor of 4:1 in the horizontal direction and by a factor of 2:1 in the vertical direction.

With continuing reference to FIG. 1, the selected pixels "S1", "S2", "S3", . . . "S35" in some embodiments are identified using a pre-calculated pixel selection matrix 22, which was pre-calculated prior to performing the sub-sampling by a sub-sampling pixel selection processor 24 based partially on pseudorandom numbers produced by a pseudorandom numbers generator 26. As will be described, the selections follow a generally periodic pattern or sequencing in which each selection is diagonal from the previous selection. In some embodiments, however, this periodicity is occasionally interrupted at random or pseudorandom intervals by a selection other than the diagonal position of the previous selection. One approach for achieving such a quasi-periodic selection pattern is by employing a weighting factor P 30 biasing toward selecting a pixel in each sub-sampling cell that is distal from the pixel selection positions of one or more neighboring sub-sampling cells. Biasing toward selection of the distal position tends to produce an alternating selection pattern similar to half-bitting, which tends to avoid digitization artifacts such as so-called "jaggie" defects in the rasterization of text and line art. Introducing some randomness into the sub-sampling selections breaks up larger-scale ordering of the selections. Large-scale ordering in the selections can produce image artifacts, such as ineffective reduction of jaggie defects for lines of certain orientations, visually perceptible moiré patterns, and so forth, in the digitized image.

Figure 4A:
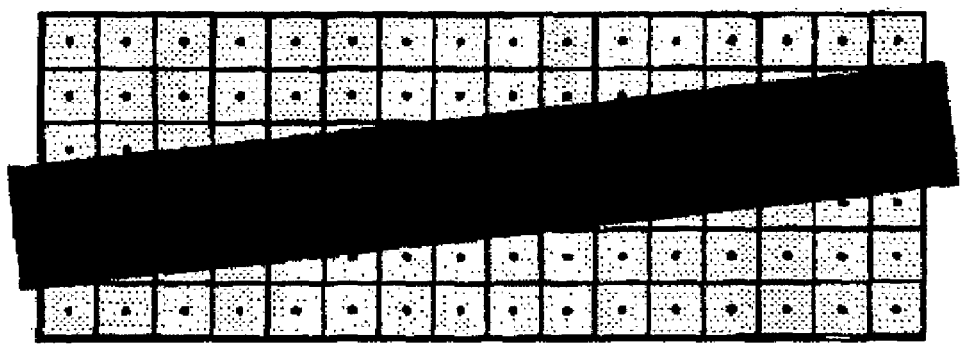
FIGS. 4A-4F show 600 dpi rasterizations of a near vertical line (FIG. 4A) and a near horizontal line (FIG. 4D), both using conventional sampling points that generate jaggies (FIGS. 4B and 4E), and sampling points that vary horizontally and vertically to produce half bitting patterns (FIGS. 4C and 4F).
Figure 4B:
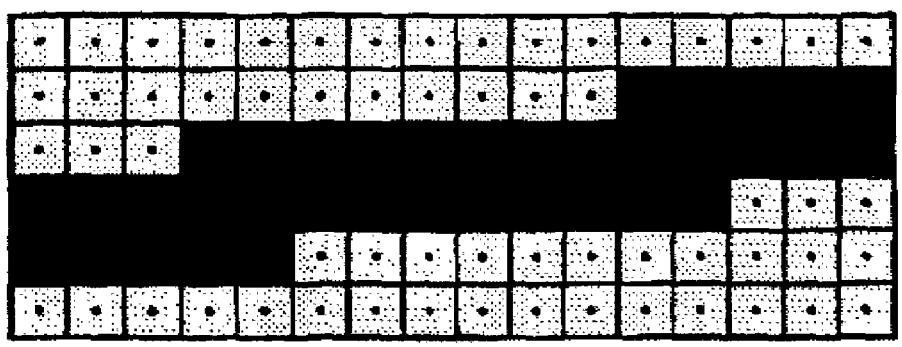
Figure 4C:
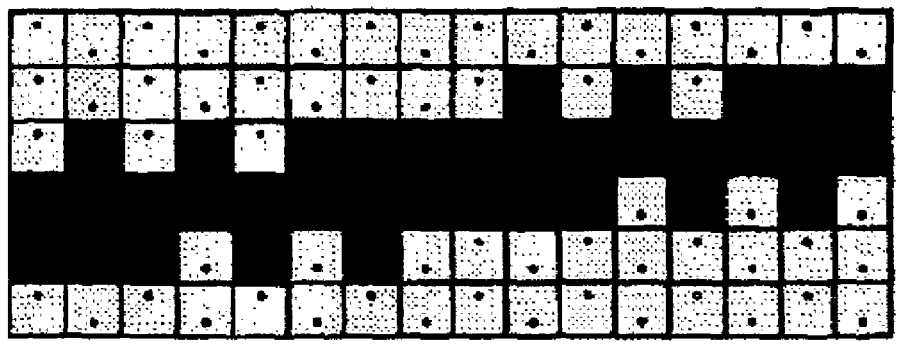
Figure 4D:
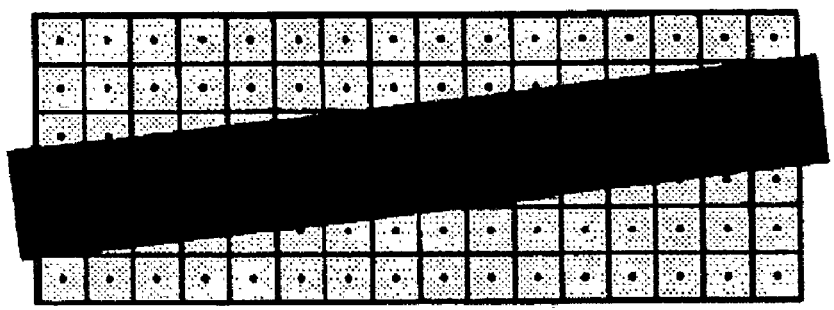
Figure 4E:
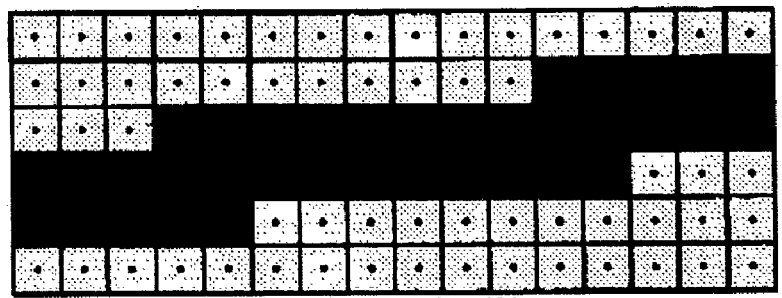
Figure 4F:
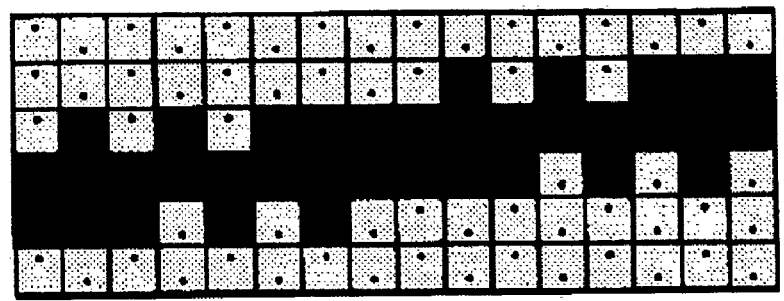

An example of how a periodic pattern of alternating sub-sampling positions advantageously reduces jaggie defects is illustrated in FIGS. 4A-4F. FIG. 4A shows a nearly vertical line along with a sampling grid. Sampling the center of each cell (as indicated by a dot in the center of the square cell), generates jaggie artifacts on the sampled line, as shown in FIG. 4B. However, sampling the nearly vertical line of FIG. 4A by horizontally toggling the sampling point from left to right within the sub-sampling cell, half-bitting patterns are generated on the sampled line, as shown in FIG. 4C. Similarly, sampling a nearly horizontal line shown in FIG. 4D by sampling the center of a cell generates jaggie artifacts on the sampled line, as shown in FIG. 4E. However, sampling the nearly horizontal line of FIG. 4D by vertically toggling the sampling point from up to down within the sub-sampling cell, half-bitting patterns are generated on the sampled line, as shown in FIG. 4F. When using a 2×2 sub-sampling cell, toggling between to diagonally opposite sub-sampling positions reduces both horizontal and vertical jaggie defects.

Figures 5A, 5B, 5C:
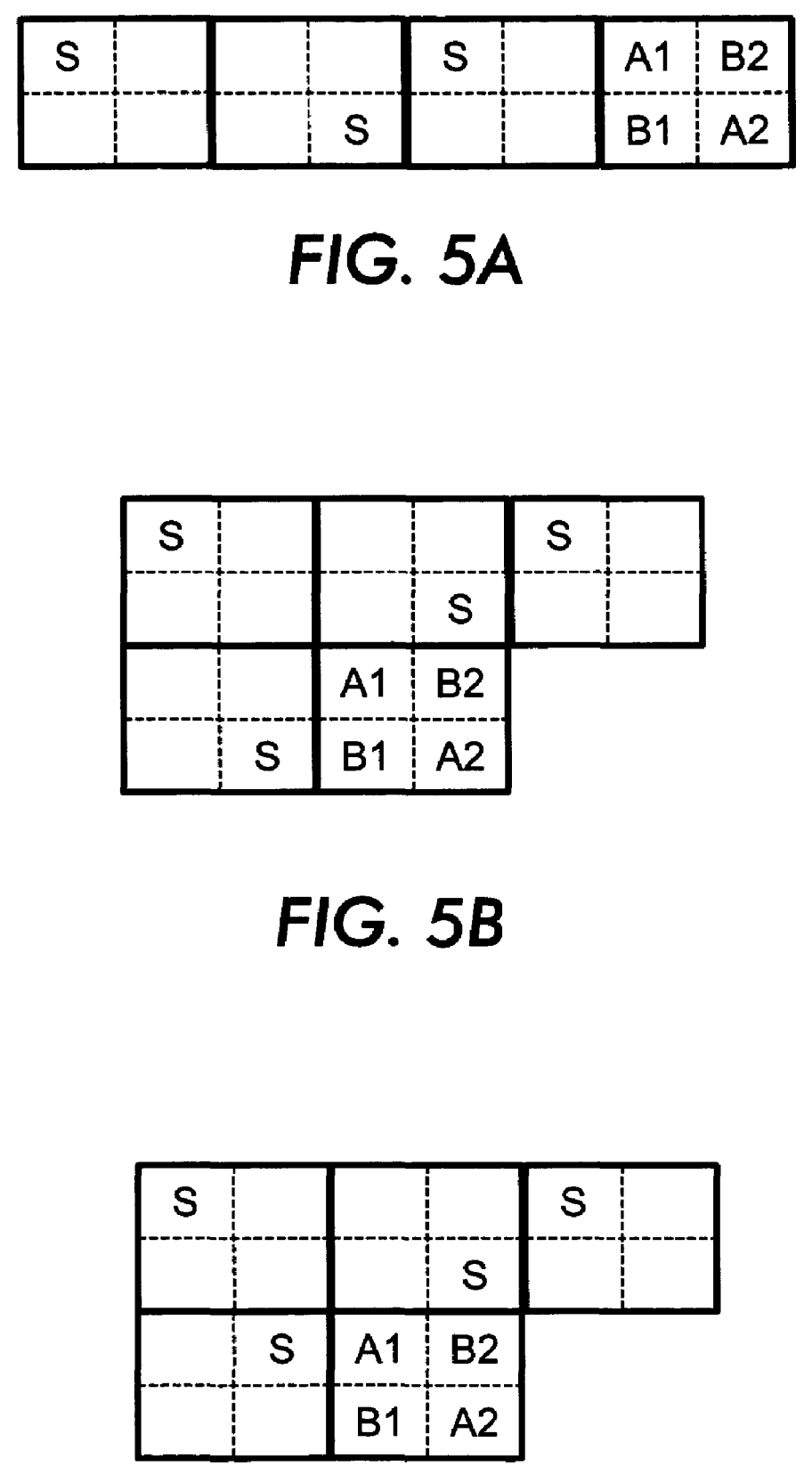

With reference to FIGS. 5A-5C, a suitable quasi-periodic sub-sampling selection technique employing randomized or pseudorandomized biasing is described. In FIG. 5A, the selection in each sub-sampling cell is biased based on the pixel selection position of the sub-sampling cell immediately to the left in the horizontal direction. For a 2×2 sub-sampling cell, the pixel selection position that is distal from the pixel selection of the neighboring sub-sampling cell immediately horizontally adjacent thereto is that position diagonally across from the previous pixel selection position. For example, consider the sub-sampling cell of FIG. 1A whose pixel positions are labeled A1, A2, B1, B2. In the sub-sampling cell immediately left adjacent to this cell, the pixel selection (labeled "S") was the A1 position. The diagonal position respective to A1 is A2. That is, A1 and A2 are a diagonal pair. Similarly, the pixel positions B1 and B2 form another diagonal pair.

In the selection algorithm of FIG. 5A, selection probabilities are defined as follows. Given the pixel selection position of the horizontally adjacent sub-sampling cell, the diagonal position from that pixel selection position has a selection probability corresponding to the weighting P 30, in which P is greater than 0.5. The two pixel positions which are neither: (i) the pixel selection position of the horizontally adjacent sub-sampling cell, nor (ii) the diagonal position thereto, are each assigned selection probabilities of (1−P)/2. For the sub-sampling cell in FIG. 4A in which the positions A1, A2, B1, B2 are labeled, these probability assignments correspond to the following selection probabilities: A1 has selection probability zero (since A1 was the pixel selection position of the horizontally adjacent sub-sampling cell); A2 has selection probability P (since A2 is the diagonal of A1); and the remaining two pixel positions B1 and B2 each have a selection probability of (1−P)/2.

Since weighting P 30 is greater than 0.5, it follows that in the selection algorithm of FIG. 5A the selection probabilities of B1 and B2 can be no larger than 0.25. In some preferred embodiments, the weighting P 30 is greater than or equal to about 0.7 and less than or equal to about 0.95. For sub-sampling 1200 dpi to generate 600 dpi, a weighting P 30 equal to about 0.9 has been found to be effective. It will be appreciated that with a high value for the weighting P 30, the selections are generally periodic with a period of (A1, A2) or a period of (B1, B2). Occasionally, however, the periodicity is interrupted by a non-diagonal selection which switches the periodicity to the other period. For example, one possible selection sequence portion is: A1, A2, A1, A2, A1, B1, B2, B1, B2, B1, B2, A2, A1, A2, A1. This sequence portion includes a first periodic portion: A1, A2, A1, A2, A1, which results from strong biasing toward selecting the diagonal element. This first periodic portion is followed by a random disruption at the B1 selection. A second periodic portion: B1, B2, B1, B2, B1, B2 follows, which is disrupted at the transition from B2 to A2, at which point the periodicity returns to the (A1, A2) period.

Although in the algorithm of FIG. 5A the pixel selection position of the horizontally adjacent sub-sampling cell is assigned probability of zero, in some similar algorithms this position is assigned a small residual probability to introduce additional randomness through the possibility of repeating a selection position in two horizontally adjacent sub-sampling cells. Since the probabilities of the four possible pixel selection positions should add up to unity, this optional residual probability should be compensated by lowering one or more probabilities of the remaining selection positions of the sub-sampling cell. Moreover, in some embodiments the probability P=1 such that there are no random disruptions.

With reference to FIGS. 5B and 5C, another selection algorithm is described, which takes into account the pixel selection positions of both the horizontally adjacent neighboring sub-sampling cell and the vertically adjacent neighboring sub-sampling cell. In the selection algorithm of FIGS. 5B and 5C, the cell top (A1 and B2) or bottom (B1 and A2) vertical position is selected which is biased toward being opposite the vertical position of the pixel selection of the horizontally adjacent sub-sampling cell. Similarly, the cell left (A1 and B1) or right (B2 and A2) horizontal position is selected which is biased toward being opposite the horizontal position of the pixel selection of the vertically adjacent sub-sampling cell. In some embodiments, the biasing is as follows: the probability of selecting the opposite horizontal position (equivalent to selecting the opposite column in the case of a 2×2 sub-sampling cell) is the weighting P 30, which is greater than 0.5, while the probability of selecting the same horizontal position or column is (1−P). Similarly, the probability of selecting the opposite vertical position (equivalent to selecting the opposite row in the case of a 2×2 sub-sampling cell) is the weighting P 30, while the probability of selecting the same horizontal position or row is (1−P).

For example, in FIG. 5B, considering the sub-sampling cell in which the positions A1, A2, B1, B2 are labeled, the pixel selection of the vertically adjacent sub-sampling cell is the A2 position which lies in the right column of the 2×2 sub-sampling cell. Hence, the horizontal position selection is biased toward selecting the left column. Similarly, the pixel selection of the horizontally adjacent sub-sampling cell is also the A2 position which lies in the bottom row of the 2×2 sub-sampling cell. Hence, the vertical position selection is biased toward selecting the top row. These two biases will tend to produce selection of the A1 position which is distal from the selection positions of both horizontally and vertically adjacent cells. If the probability of selecting each of the specified horizontal and vertical positions is P 30, then the probability of selecting the diagonal position (A1) is $P^2$, while the probability of repeating the selecting the same position (A2) is $(1-P)^2$. The probability for each of position B1 and position B2 is P(1−P). In some preferred embodiments the weighting P 30 is greater than or equal to about 0.7 and less than or equal to about 0.95. For sub-sampling 1200 dpi to generate 600 dpi, a weighting P 30 equal to about 0.9 has been found to be effective. For P=0.9 and the selection situation depicted in FIG. 4B, the probability of selecting the diagonal position (A1) is $P^2$=0.81, the probability of repeating the same position (A2) is $(1-P)^2$=0.01, and the probability of selecting either B1 or B2 is P(1−P)=0.09.

With reference to FIG. 5C, the same algorithm is applied for the sub-sampling cell in which the positions A1, A2, B1, B2 are labeled. In FIG. 4C, however, the vertically adjacent sub-sampling cell has selection position A2 while the horizontally adjacent sub-sampling cell has a different selection position B2. Hence, the probability of selecting the right column is P, the probability of selecting the left column is (1−P), the probability of selecting the bottom row is P, the probability of selecting the top row is (1−P). On a pixel basis, the probabilities are: P(A1)=P(A2)=P(1−P), ; and P(B1)=$P^2$; and P(B2)=$(1-P)^2$. In general, the algorithm of FIGS. 5B and 5C produces bias toward one pixel position having probability $P^2$, and lower probabilities of P(1−P), P(1−P), and $(1-P)^2$ for the remaining three pixels.

In sub-sampling which proceeds from left-to-right and top-to-bottom starting in the upper left, the first row of sub-sampling has only horizontally adjacent sub-sampling cells, while subsequently sub-sampled rows have both horizontally and vertically adjacent sub-sampling cells. Thus, the selection algorithm of FIG. 5A is suitably applied for sub-sampling the first row which does not have vertically adjacent neighboring sub-sampling cells, while the selection algorithm of FIGS. 5B and 5C is suitably applied for sub-sampling subsequent rows.

Figure 6A:
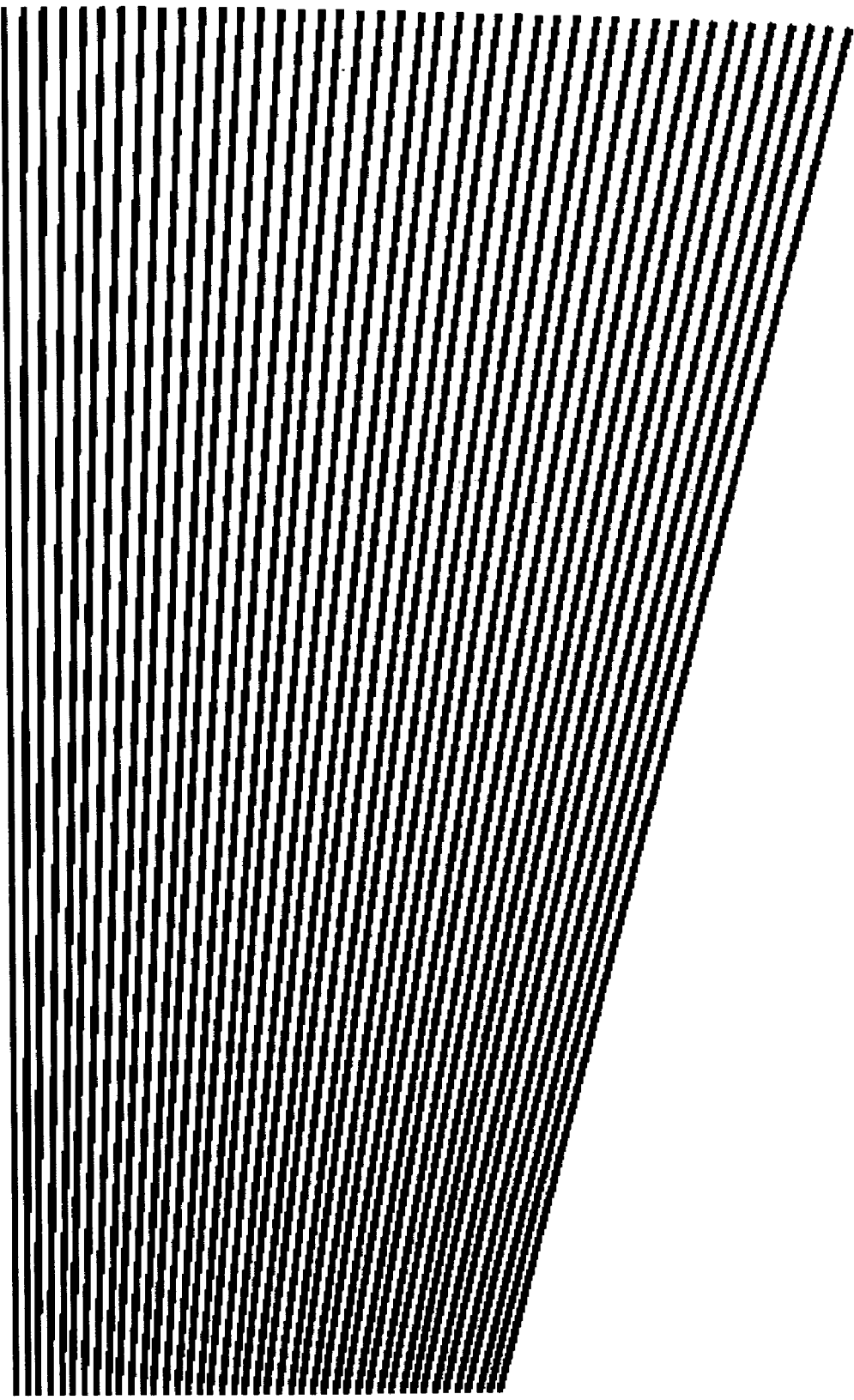
FIGS. 6A and 6B show, respectively, a 600 dpi line art image having substantial visually perceptible jaggie and moiré artifacts, and a 600 dpi line art image employing sub-sampling described herein to reduce these artifacts.
Figure 6B:
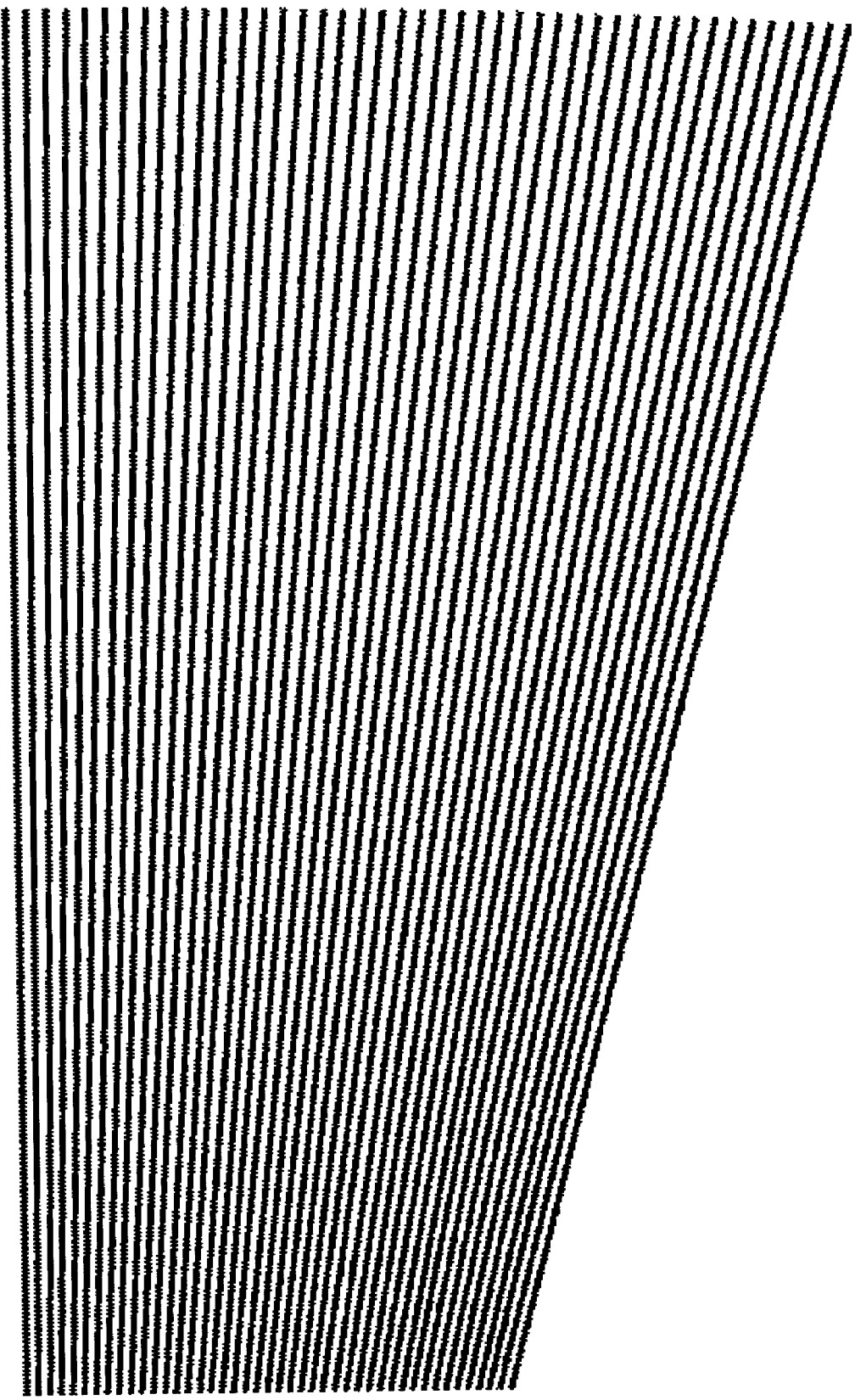

FIGS. 6A and 6B show a rastered line art image having relatively thick lines that are slanted with respect to the horizontal and vertical axes. In FIG. 6A, the line image is rastered at 600 dpi without the using the sub-sampling algorithms disclosed herein. This image has a large number of visually perceptible jaggie artifacts along each line. Furthermore, these jaggie artifacts exhibit a longer range ordering that is visually perceived as moiré patterns. Four moiré whorl patterns are visually perceived in FIG. 6A by most persons.

In FIG. 6B, the line image is rastered at 1200 dpi and sub-sampled at 600 dpi using the sub-sampling algorithms disclosed herein, with the weighting factor P=0.9. Although the rasterized image of FIG. 6B has the same 600 dpi resolution as the rasterized image of FIG. 6A, the jaggie artifacts and moiré patterns are substantially suppressed in FIG. 6B by the sub-sampling.

The described sub-sampling algorithms are examples which have been found to produce visually pleasing results for numerous test images. Those skilled in the art can readily construct other sub-sampling pixel selection algorithms which tend to produce periodic or quasi-periodic pixel selection patterns or sequencing in which pixel positions for each sub-sampling cell that are distal from the selection positions of one or more neighboring sub-sampling cells are generally selected, but which also incorporate some random or pseudorandom periodicity disruptions. For example, the sampling algorithm of FIG. 5A can be applied in situations having both vertical and horizontal neighboring sub-sampling cells by defining the diagonal position as that pixel position which has the opposite column from the pixel selection of the vertically neighboring cell and the opposite row from the pixel selection of the horizontally neighboring cell. For sub-sampling cells having dimensions other than 2×2, suitable generally periodic selection algorithms can be developed which tend to produce selection positions that alternate amongst the available pixel selection positions of the sub-sampling cell. Generally, the selection algorithm should tend to select relatively distal pixels in successive sub-sampling cells to break up vertical and horizontal jaggie artifacts, but should also introduce some randomness or pseudorandomness to the selections to break up longer range ordering and reduce moiré patterns or other long-range artifacts.

The sub-sampling algorithm preferably follows a generally periodic sub-sampling pattern as it moves from sub-sampling cell to sub-sampling cell, such as alternating between two diagonal corners of a 2×2 array from cell to cell. A wholly deterministic periodic sub-sampling pattern (for example, A1, A2, A1, A2, A1, A2, . . . ) can be used, and provides good sub-sampling for most documents. For a more robust sub-sampling that provides good results for substantially all documents, disruptions of the periodicity are randomly or pseudorandomly introduced into the sub-sampling pattern, for example by (for 2×2 sub-sampling cells) switching between the (A1, A2) periodicity and the (B1, B2) periodicity at randomly or pseudo-randomly selected points in the generally periodic sub-sampling pattern or sequencing. The overall sub-sampling pattern including such occasional random or pseudo-random disruptions is quasi-periodic. In some embodiments the quasi-periodic sub-sampling pattern including the random or pseudo-random disruptions are pre-computed and stored, for later recall during sub-sampling of a specific document. Functionally, the generally periodic sub-sampling pattern breaks up short-range jaggie defects and the like, while the occasional random or pseudo-random disruptions in periodicity break up longer range ordering.

With returning reference to FIG. 1, the periodic or quasi-periodic sub-sampling advantageously reduces jaggie artifacts, moiré patterns, and other artifacts in text and line art images. The sub-sampling can also be used in processing halftone images, which represent grayscale intensities by suitable combinations of binary pixels. The combinations of binary pixels representing the various gray scale levels are typically represented by a dither array, halftone cell, or dither dot. A suitably constructed custom halftone cell 40 enables the described sub-sampling approaches to provide substantial improvement in the visual quality of a sub-sampled halftone image, with no change in the sub-sampling technique beyond using the custom halftone cell 40 in the high resolution rastering.

Figure 7:
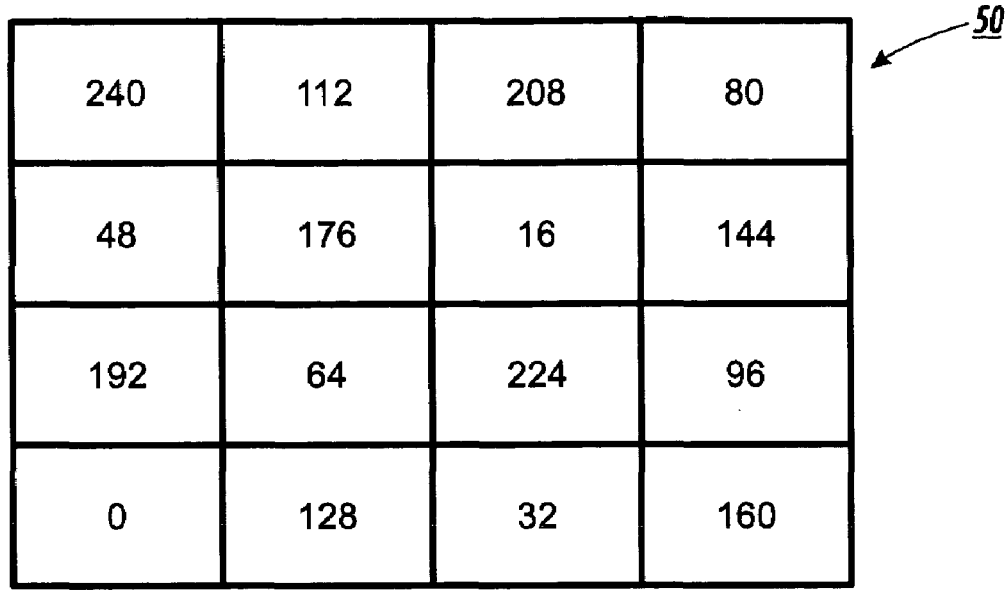
FIG. 7 shows an example dithering array or halftone cell suitable for use at the second lower resolution.

With reference to FIG. 7, an example 4×4 halftone cell or dither array 50 of the lower second resolution is depicted. The value of each pixel of the 4×4 halftone dither array 50 represents a threshold value. The dither array 50 could be applied as an overlay to 4×4 sub-sets of pixels of the second resolution raster in direct rasterization of a grayscale image at the second resolution. The dither array 50 is suitable for rasterizing a gray scale image having 256 gray scale levels. For each pixel sampled at the lower second resolution, the threshold of the corresponding pixel of the dither array 50 would be applied to determine whether the sample represents a black dot or a white dot. Thus, in a region of gray scale level 66, sampled pixels aligned with pixels of the dither array 50 having threshold values less than 66 would be white, while sampled pixels aligned with pixels of the dither array 50 having threshold values greater than or equal to 66 would be black.

The high resolution raster image processor 12 rasterizes the document 10 at the first resolution which is higher than the second resolution. For the example in which the rasterizing is performed at 1200 dpi while the marking engine 14 operates at 600 dpi, the custom halftone cell or dither array 40 should be a 1200 dpi resolution array, while the dither array 50 of FIG. 7 is 600 dpi for this example. Hence, the dither array 50 of FIG. 7 cannot serve as the custom halftone cell 40. Rather, the custom halftone cell or dither array 40 is suitably leveraged or constructed from the lower second resolution dither array 50 such that the sub-sampling techniques described herein either do not degrade the resultant lower resolution halftone image, or actually improve the visual appearance of the lower resolution halftone image.

Figure 8:
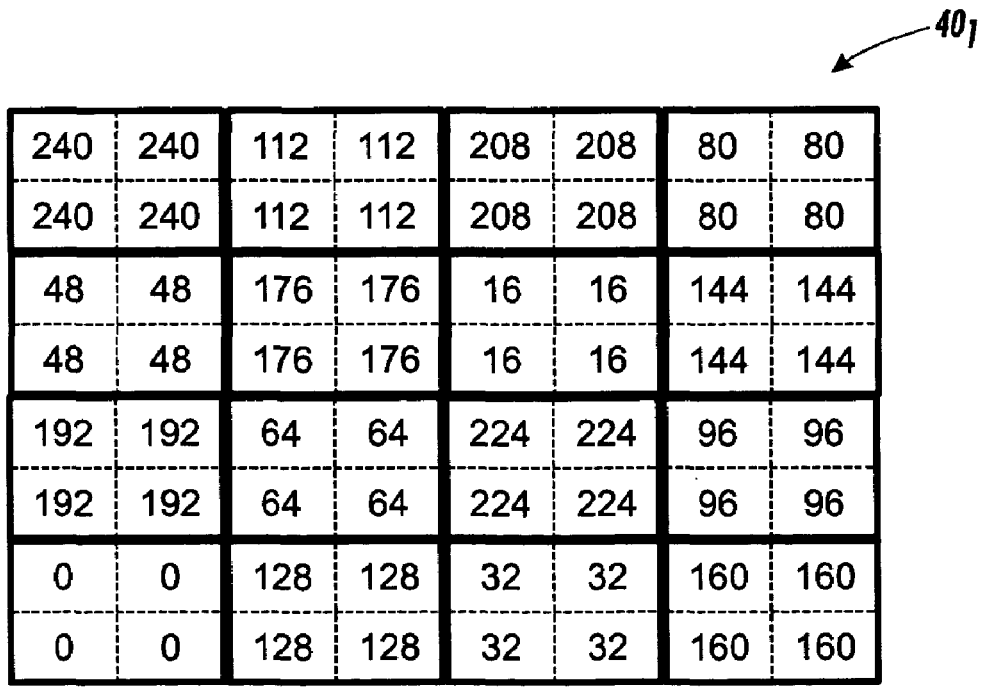
FIG. 8 shows a custom dithering matrix or halftone cell at the higher first resolution which is leveraged or derived from the dithering array or halftone cell of FIG. 7, and which is compatible with the sub-sampling processes described herein.

With reference to FIG. 8, a halftone cell or dither array $40_1$ of the higher first resolution is derived from the halftone cell 50 of FIG. 7 as follows. Each pixel of the halftone cell 50 is divided into a 2×2 arrangement of pixels, each having the same threshold value as the source pixel of the halftone cell 50. In some embodiments, the halftone rasterizing is performed using the dither array $40_1$ as the custom halftone cell 40, with the 2×2 arrangements of pixels of the dither array $40_1$ aligning with the 2×2 sub-sampling cells used in the subsequent sub-sampling. As a result, when the sub-sampling is applied the same halftone threshold is employed regardless of which of the four pixel positions is selected in each sub-sampling cell. Since in a typical grayscale image the grayscale intensity varies slowly on the scale of a 2×2 arrangement of pixels of the first resolution, and the threshold value is the same for all four pixels of the 2×2 array, substantially the same thresholded binary pixel value (e.g., white or black) is obtained regardless of which of the four pixels of the sub-sampling array is selected. Hence, when using the custom dither array $40_1$ of FIG. 8, the sub-sampling has substantially no effect on the halftone image at the lower second resolution.

Accordingly, by using the dither array $40_1$ of FIG. 8 as the custom dither array 40 in the image processing system of FIG. 1, the sub-sampling provides improved visual appearance when a text or line art image at the first resolution is printed at the lower second resolution. Additionally, the sub-sampling does not degrade the visual appearance of a halftone image at the first resolution which is printed at the lower second resolution.

Figure 9:
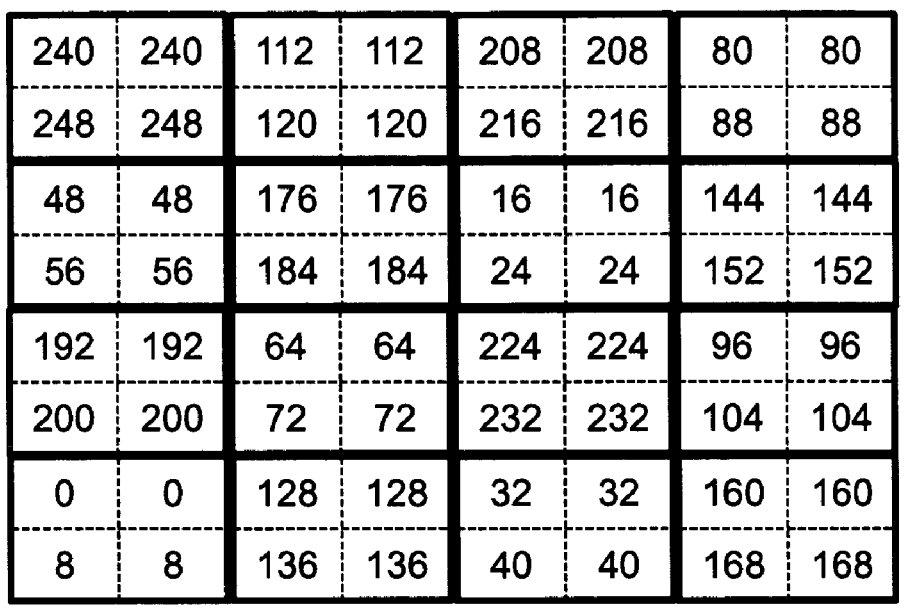
FIG. 9 shows another custom dithering matrix or halftone cell derived from the dithering array or halftone cell of FIG. 7, which provides improved visual appearance for grayscale images at the lower second resolution produced by the sub-sampling processes described herein.

With reference to FIG. 9, another halftone cell or dither array $40_2$ of the higher first resolution is derived from the lower resolution halftone cell 50 of FIG. 7 as follows. Each pixel of the halftone cell 50 is divided into a 2×2 arrangement of pixels. The top row of the 2×2 arrangement has the same threshold value as the source pixel of the halftone cell 50. The bottom row of the 2×2 arrangement has the threshold value of the source pixel of the halftone cell 50 plus an offset of one-half of the grayscale spacing of the thresholds of the halftone cell 50 of FIG. 7. As seen in FIG. 7, the spacing of thresholds in the halftone cell 50 is sixteen; hence the offset used in the dither array $40_2$ is eight. For example, the upper left pixel of the halftone cell 50 which has threshold value 240 is divided into a 2×2 arrangement of pixels in which the top row of pixels has threshold value 240 while the bottom row of pixels has threshold value 248. Alternatively, the left two pixels could have the threshold value 240 and the right two pixels could have the threshold value 248. Because the sub-sampling is biased toward alternating between the pixels of a diagonal pair (e.g., alternating between the pixel positions A1, A2, or alternating between the pixel positions B1, B2), successive sub-sampling cells will typically alternate between the lower threshold value and the higher threshold-plus-offset value. Optionally, some randomness or pseudo-randomness is built in due to optional occasional random or pseudo-random disruption of the periodicity of the sub-sampling. The resulting binary patterns of the halftone image of the lower second resolution have stoclustic-type characteristics and support twice as many grayscale levels as the halftone cell 50 of FIG. 7. Hence, when using the custom dither array $40_2$ of FIG. 9, the sub-sampling has a beneficial effect on the halftone image at the lower second resolution. For example, abrupt grayscale shifts between regions of different halftone thresholds are reduced through the larger number of grayscale levels and by the stoclustic patterns present at boundaries between regions of different threshold values.

Figure 10:
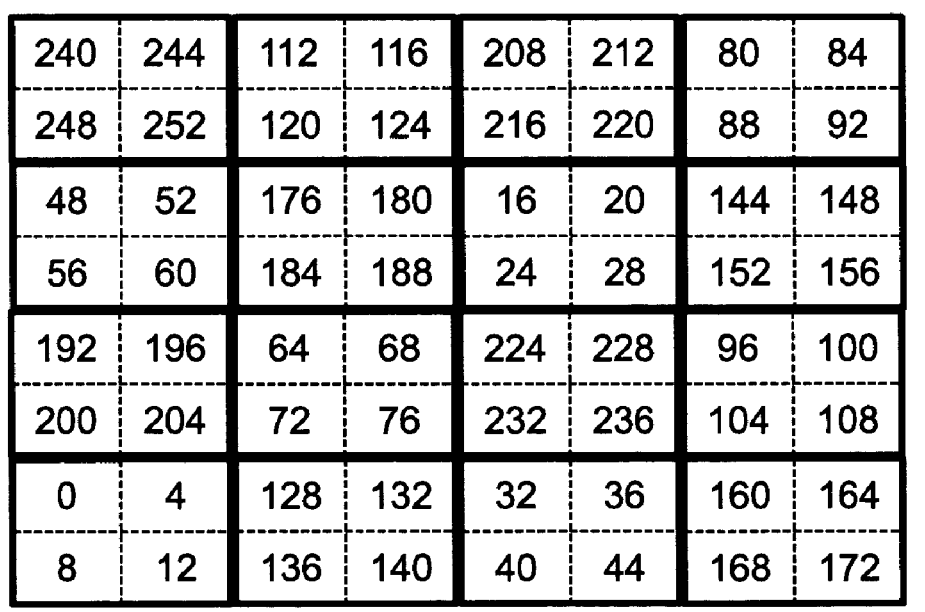
FIG. 10 shows yet another custom dithering matrix or halftone cell derived from the dithering array or halftone cell of FIG. 7, which provides improved visual appearance for grayscale images at the lower second resolution produced by the sub-sampling processes described herein.

With reference to FIG. 10, a halftone cell or dither array $40_3$ of the higher first resolution is derived from the lower resolution halftone cell 50 of FIG. 7 as follows. Each pixel of the halftone cell 50 is divided into a 2×2 arrangement of pixels. The four pixels of the 2×2 arrangement are assigned respective values of: (i) the threshold value of the source pixel of the halftone cell 50; (ii) the threshold value of the source pixel of the halftone cell 50 plus an offset of four; (iii) the threshold value of the source pixel of the halftone cell 50 plus an offset of eight; and (iv) the threshold value of the source pixel of the halftone cell 50 plus an offset of twelve. The increment of four in threshold value offset among the four pixels of the 2×2 arrangement of pixels corresponds to one-fourth of the spacing of thresholds in the lower resolution halftone cell 50. For example, the upper left pixel of the halftone cell 50 which has threshold value 240 is divided into a 2×2 arrangement of pixels having threshold values of 240, 244, 248, and 252. As the sub-sampling alternates samples amongst the four available thresholds, the resulting binary patterns of the halftone image of the lower second resolution have stoclustic-type characteristics and support four times as many grayscale levels as the halftone cell 50 of FIG. 7. Hence, when using the custom dither array $40_3$ of FIG. 10, the sub-sampling again has a beneficial effect on the halftone image at the lower second resolution.

These examples of deriving custom dither arrays of the first resolution from a dither array of the second resolution are only examples, and can be varied in many ways by those skilled in the art. For example, the halftone cell 50 of the second resolution can be replaced by substantially any other dithering array configuration that provides good halftone dithering at the lower second resolution. As another example, the techniques used to construct halftone cells $40_1$, $40_2$, and $40_3$ can be intermingled to produce a hybrid dither array which exhibits the characteristics of halftone cells $40_1$, $40_2$, and $40_3$ supported over distinct grayscale intervals. Moreover, if the ratio of the higher first resolution to the lower second resolution is other than an isotropic 2:1 ratio, then the number of pixels in each sub-sampling cell, and hence the number of pixels each low resolution dither array pixel is divided into, may be other than 2×2. For example, if the higher resolution is 2400 dpi and the lower resolution is 600 dpi, then a 4×4 sub-sampling matrix is suitable, and each low resolution dither array pixel is divided into a corresponding 4×4 array of pixels, which then can support up to sixteen grayscale thresholds. Similarly, non-isotropic sub-sampling can be supported.

The image processing system shown in FIG. 1 is compatible with existing systems that have a raster image processor rasterizing at the higher first resolution. Modifying such a system to incorporate the biased random or biased pseudo-random sub-sampling techniques described herein involves inserting the sub-sampler 20 into the data flow between the high resolution raster image processor 12 and the low resolution marking engine 14, and coupling the custom halftone cell 40 with the high resolution raster image processor 12. Existing raster image processors are typically configured to accept custom halftone cells, and so readily accept the custom halftone cell 40 designed to work with the biased random or biased pseudorandom sub-sampling.

However, the system of FIG. 1 has the disadvantage that the document source 10 is fully rasterized at the higher first resolution, from which the sub-samples are then extracted. For an isotropic 2:1 resolution reduction, this involves rasterizing four times as many pixels as are actually printed. Such excess rasterizing is inefficient and can slow down the data processing.

Figure 11:
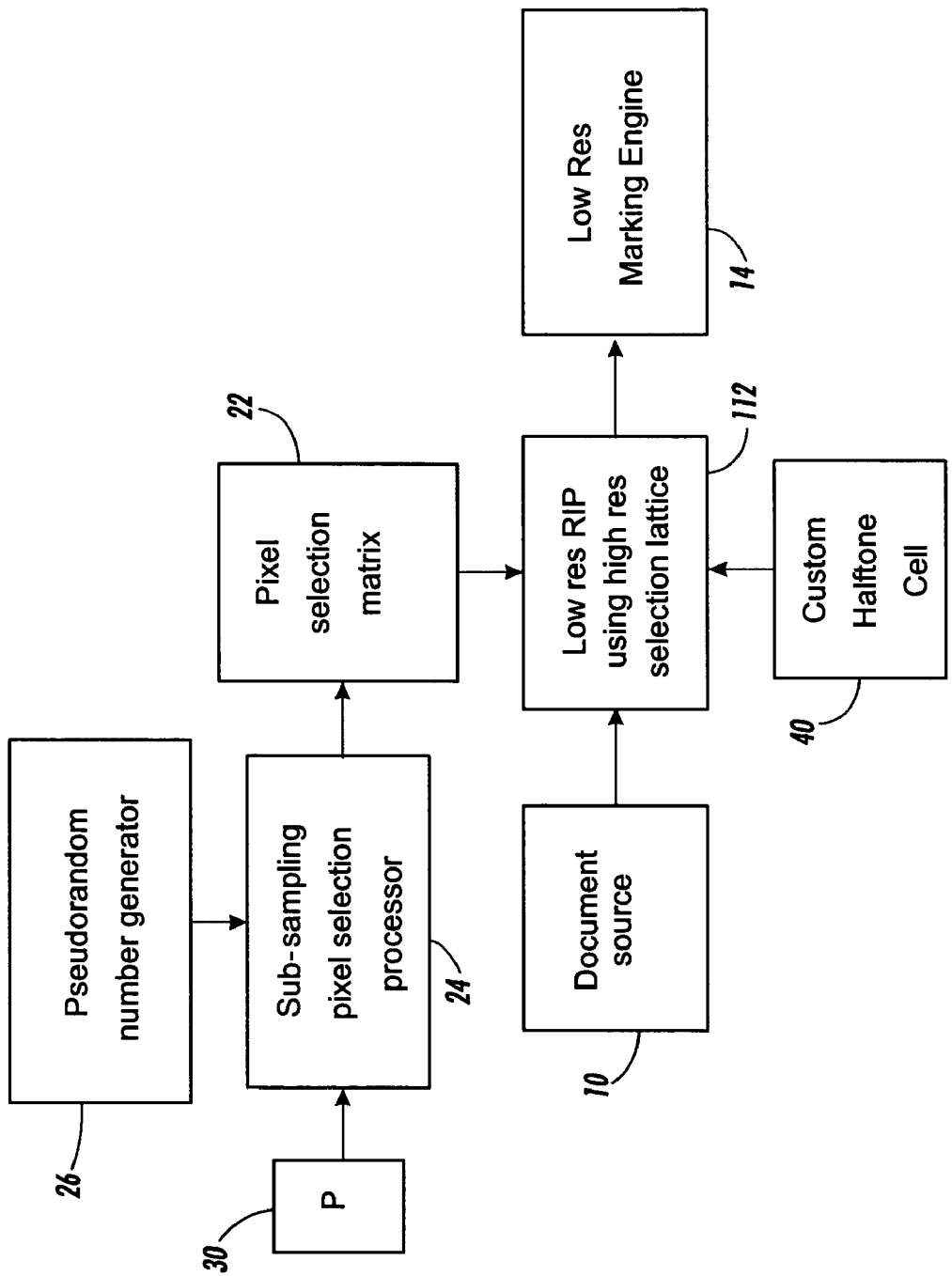
FIG. 11 diagrammatically shows an alternative image processing system which rasters an image at a second lower resolution using sub-sampling at a higher resolution selection lattice to produce a second lower resolution raster compatible with a lower resolution marking engine.

With reference to FIG. 11, a more efficient image processing sequence can be produced by replacing the raster image processor 12 with a modified raster image processor 112 which performs rasterization at the lower resolution using sampling at the higher resolution along with sub-sampling substantially similar to the sub-sampling performed by the sub-sampler 20 of FIG. 1. In the embodiment of FIG. 11, the raster image processor 112 directly employs the sub-sampling to identify the selected pixels defining the second raster having the second resolution prior to or during rasterization of the document source 10 at the first resolution. Since it is known which pixels are selected by the sub-sampling before the high resolution rasterizing is actually performed, the raster image processor 112 only obtains values for those selected pixels defining the second raster. For an isotropic 2:1 sub-sampling ratio, this reduces the number of values which need to be obtained by a factor of four.

In the image processing systems of FIGS. 1 and 11, the sub-sampling accesses the pre-calculated pixel selection matrix in performing the sub-sampling. In other contemplated embodiments, the pixel selections are not pre-calculated, but rather each pixel selection is calculated at the time that the sub-sampling calls for that selection. This approach may be advantageous from a memory standpoint by allowing the pixel selection matrix 22 to be omitted; however, the substantially real-time computation of each pixel selection during sub-sampling may slow the image processing.

The same pixel selection matrix 22 can generally be reused for each printed page or other rendering. Accordingly, in some embodiments the sub-sampling pixel selection processor 24 can be omitted from a given image processing implementation, and the pixel selection matrix 22 can be calculated elsewhere and supplied to the customer or other end-user as a file on a disk, over the Internet, or so forth.

While the example image processing systems of FIGS. 1 and 11 output to the marking engine 14, it will be appreciated that the output of the sub-sampler 20 (or the output of the modified raster image processor 112 which directly performs sub-sampling) can be used in other ways. For example, it may be useful to reduce a higher resolution image to a lower resolution for transmission over the Internet or over another digital network, or for storage on a non-volatile medium of limited storage capacity. In these applications, the sub-sampling provides data compression for reduced bandwidth transmission or reduced file storage size.

The exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method comprising:
    dividing a first raster having a first resolution into a plurality of sub-sampling cells each including a 2×2 arrangement of neighboring pixels; and
    selecting a pixel from each of the sub-sampling cells in a periodic or quasi-periodic pattern biased toward selecting a pixel position within each sub-sampling cell that is distal from a selection position within at least one neighboring sub-sampling cell, the selected pixels defining a second raster having a second resolution lower than the first resolution, the selecting including selecting a pixel in one of the three positions of the 2×2 arrangement other than the selection position of the neighboring sub-sampling cell, the selection being biased toward the position diagonal from the selection position of the neighboring sub-sampling cell,
    wherein the above steps are performed by a raster image processor and a sub-sampler.

2. The method as set forth in claim 1, wherein the biasing comprises:
    assigning a selection probability of P to the diagonal position where P is greater than 0.5; and
    assigning a selection probability of (1−P)/2 to the remaining positions.

3. The method as set forth in claim 2, wherein P is greater than or equal to about 0.7 and is less or equal to about 0.95.

4. The method as set forth in claim 2, wherein P is about 0.9.

5. The method as set forth in claim 1, wherein the selecting comprises:
    selecting the pixels in accordance with a quasi-periodic sequence of pixel selection positions that is substantially periodic but which has its periodicity disrupted at random or pseudorandom points in the sequence.

6. The method as set forth in claim 5, wherein the selecting comprises:
    computing periodic sequence of pixel selection positions;
    storing the computed periodic sequence of pixel selection positions; and
    subsequent to the storing, recalling the stored pixel selection position for each sub-sampling cell and selecting the pixel at that stored pixel selection position.

7. The method as set forth in claim 1, further comprising:
    determining values for at least those pixels of the first raster which are the selected pixels defining the second raster using raster image processing employing a binary threshold.

8. The method as set forth in claim 1, further comprising:
    determining values for at least those pixels of the first raster which are the selected pixels defining the second raster using raster image processing employing thresholds defined by a selected halftone cell of the first resolution.

9. An image processor system comprising:
    a raster image processor producing a first raster having a first resolution; and
    a sub-sampler comprising a processor configure to producing a second raster having a second resolution lower than the first resolution, the sub-sampler performing a method as set forth in claim 1.

10. The method as set forth in claim 1, further comprising:
    determining values for at least those pixels of the first raster which are identified as the selected pixels defining the second raster; and
    electrophotographically forming an image having the second resolution using the values of the selected pixels defining the second raster.

11. The method as set forth in claim 10, wherein the periodic or quasi-periodic pattern alternates between a (i) first pattern having a period consisting of: upper left pixel position, lower right pixel position and (ii) a second pattern having a period of: upper right pixel position, lower left pixel position.

12. A method comprising:
    dividing a first raster having a first resolution into a plurality of sub-sampling cells each containing a selected number of neighboring pixels;
    selecting a pixel from each of the sub-sampling cells in a periodic or quasi-periodic pattern biased toward selecting a pixel position within each sub-sampling cell that is distal from a selection position within at least one neighboring sub-sampling cell, the selected pixels defining a second raster having a second resolution lower than the first resolution; and
    determining values for at least those pixels of the first raster which are the selected pixels defining the second raster using raster image processing employing thresholds defined by a selected halftone cell of the first resolution derived from a halftone cell of the second resolution by:
        (i) dividing the selected halftone cell of the first resolution into a plurality of sub-cells, wherein each sub-cell corresponds to a pixel of the halftone cell of the second resolution; and
        (ii) assigning threshold values to the pixels of each sub-cell based on the threshold value of the corresponding pixel of the halftone cell of the second resolution,
    wherein the above steps are performed by a raster image processor and a sub-sampler.

13. The method as set forth in claim 12, wherein each sub-cell is a 2×2 arrangement of neighboring pixels, and the assigning of threshold values to the pixels of each sub-cell includes:
    assigning two thresholds equal to the threshold value of the corresponding pixel of the halftone cell of the second resolution, and assigning the other two thresholds of the sub-cell to the same value plus a first offset; and wherein the first offset value is selected such that the halftone cell of the first resolution has twice as many threshold values as the halftone cell of the second resolution.

14. The method as set forth in claim 12, wherein each sub-cell is a 2×2 arrangement of neighboring pixels, and the assigning of threshold values to the pixels of each sub-cell includes:

assigning a threshold equal to the threshold value of the corresponding pixel of the halftone cell of the second resolution plus a distinct selected offset to each of the pixels of the sub-cell, wherein the selected offset is different for each of the four pixels of the sub-cell, the different offset values being selected such that the halftone cell of the first resolution has four times as many threshold values as the halftone cell of the second resolution.

15. An image processor system comprising:

a raster image processor producing a first raster having a first resolution; and a sub-sampler comprising a processor configure to producing a second raster having a second resolution lower than the first resolution, the sub-sampler performing a method as set forth in claim 12.

* * * * *